Mar. 20, 1923.

F. H. DE BRUN.
MOTOR CAR TRANSMISSION CONTROL.
FILED FEB. 27, 1920.

Witness:
Stephen F. Reboca
B. L. MacGregor

Inventor
Frank H. DeBrun
By [signature] Attys.

Patented Mar. 20, 1923.

1,448,954

UNITED STATES PATENT OFFICE.

FRANK H. DE BRUN, OF CHICAGO, ILLINOIS, ASSIGNOR TO MUDGE & COMPANY, OF CHICAGO, ILLINOIS, A CORPORATION OF ILLINOIS.

MOTOR-CAR TRANSMISSION CONTROL.

Application filed February 27, 1920. Serial No. 361,693.

*To all whom it may concern:*

Be it known that I, FRANK H. DE BRUN, a citizen of the United States, residing at Chicago, in the county of Cook and State of Illinois, have invented certain new and useful Improvements in Motor-Car-Transmission Controls, of which the following is a specification, reference being had to the accompanying drawings, and to the reference characters marked thereon, which form a part of this specification.

This invention relates to improvements in mechanism for controlling the operating clutch of the change speed unit and of the reversing unit of transmission mechanisms of motor cars, primarily used on railroads for track inspection, and conveying workmen from one section of the track to another; though obviously, with slight modifications, it may be put to other uses.

The section hands of a railroad are usually not particularly careful or skilled in the handling of such cars and a plurality of brakes, levers, clutches or other devices for such workmen to handle in the operation of a motor car, not only causes confusion but frequently results in improper manipulation of the car, in the stripping of gears and in damage to other parts of the mechanism.

The principal object of my invention is to make a "fool proof" car control whereby the most untutored and unskilled workman may, with the minimum amount of instruction and experience, successfully operate the car without the danger of injury. To this end, I have employed a single operating handle, so arranged upon an operating shaft that it may be moved to the right or to the left to operate the clutch and effect the high and low speeds of the driving mechanism, both for forward and back movement. That is to say, the operation of this lever will effect the high and low speeds in either position of the reversing mechanism.

I have also employed means connected with this operating shaft whereby when the handle is raised, the reversing mechanism is operated. I have also employed means associated with the shaft whereby the handle may not be raised to operate the reversing mechanism and, at the same time be moved to the right or left to effect the change of speeds. That is to say, the arrangement of the parts is such that the handle is locked against longitudinal or vertical movement necessary to operate the reversing gears, with respect to or on the operating shaft, except in one position and that position is neutral.

I have also employed a movable mechanism in the handle adapted to be readily grasped by the operator to control the mechanism whereby the operating handle and the operating shaft are locked together. I have also employed in connection with the foregoing, a novel clutch operating means for effecting the change of speed.

By these means the untutored operator, grasping the handle, may swing it to the right or left to effect the change of speed, and in order to reverse the direction of motion, he will simply grasp the movable trigger on the handle and then raise or lower the same to reverse the gears.

These and other features and advantages of the invention will be more fully comprehended as I proceed with my specification.

In that form of the invention illustrated in the accompanying drawings:

Fig. 3 is a longitudinal sectional view, enlarged, through the speed gear housing, showing the interior parts and the operating connections in plan view.

Figure 1:
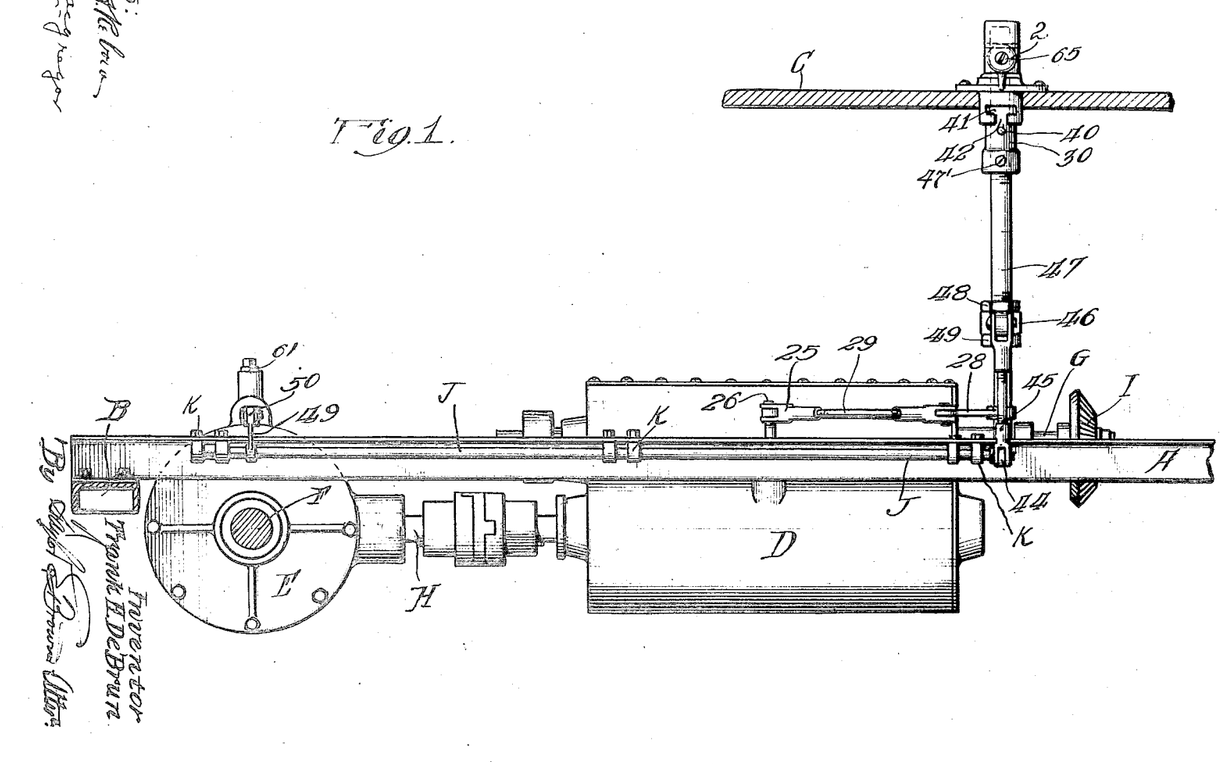
Fig. 1 is a side elevation of that portion of the car frame carrying the operating handle and shaft, and the reversing and speed gear housings, part of the view being in section.
Figure 2:
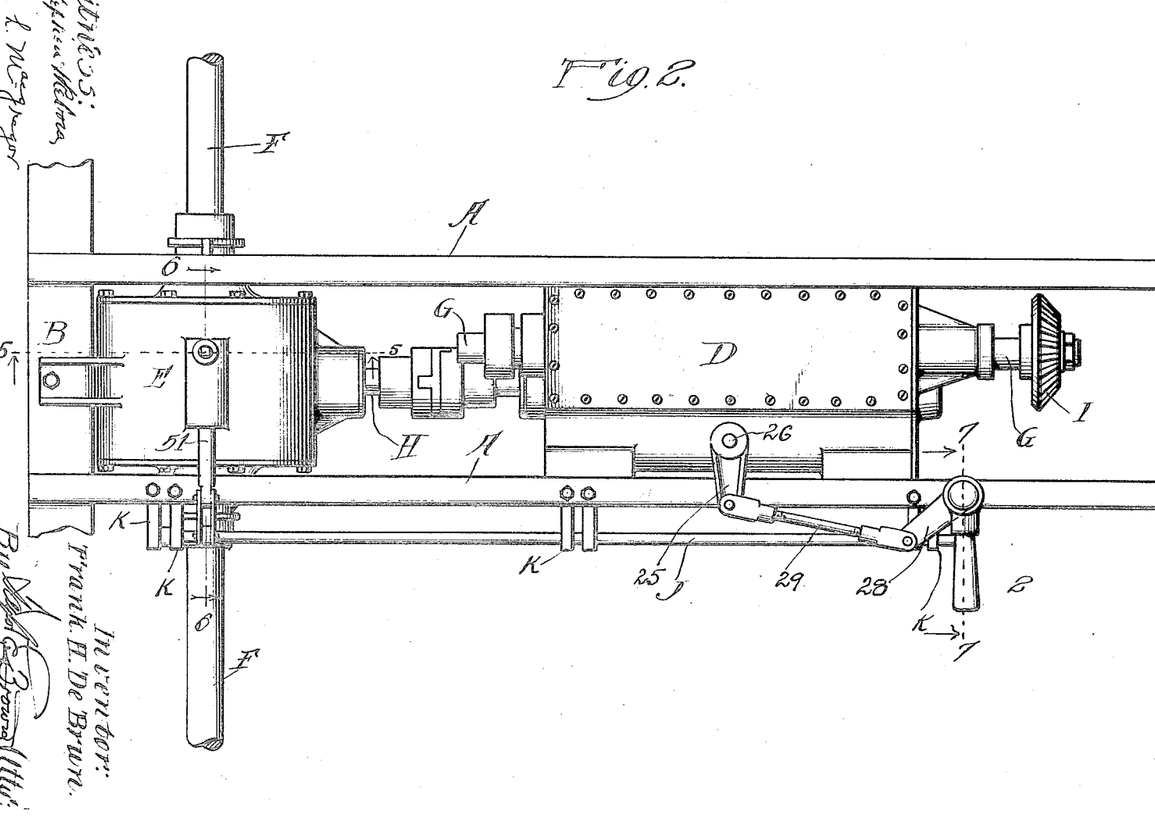
Fig. 2 is a plan view of the same parts shown in Fig. 1.

In the drawings, A, A, represent two longitudinally disposed girders or beams of the vehicle frame which may be secured in any convenient manner to the transverse beams, one of which is shown at B. C represents a part of the raised platform or part of the wooden structure through which the operating shaft 1 actuated by the handle 2 is passed, and to which it is appropriately secured, as hereinafter explained. D is the change speed gear housing as a whole, E is the reverse gear housing as a whole, F are the rear driven axles, G is the driven shaft arranged longitudinally through the housing D, H is the transmission shaft also suitably journaled in the housing D in parallel relation to the shaft G and extending into and having a journal bearing in the reverse gear housing E.

Upon the shafts G and H in the housing D are suitable gears, in this instance, two sets, 3, 4, and 5, 6, to effect two changes in speed,—the gears 3 and 6 being loosely mounted upon the shaft H. 7 and 8 are clutch members, loosely mounted on the shaft H and secured to the gears 3 and 6 respectively. Mounted upon the shaft H are the collars 9 and 10 secured by a spline 11 in each instance, so that each may rotate with the shaft H and yet be moved longitudinally thereof. An annular channeled clutch disc 12 is mounted on each of the collars 9 and 10, the channel being filled with a suitable friction packing or wear plate rings 27.

Figure 4:
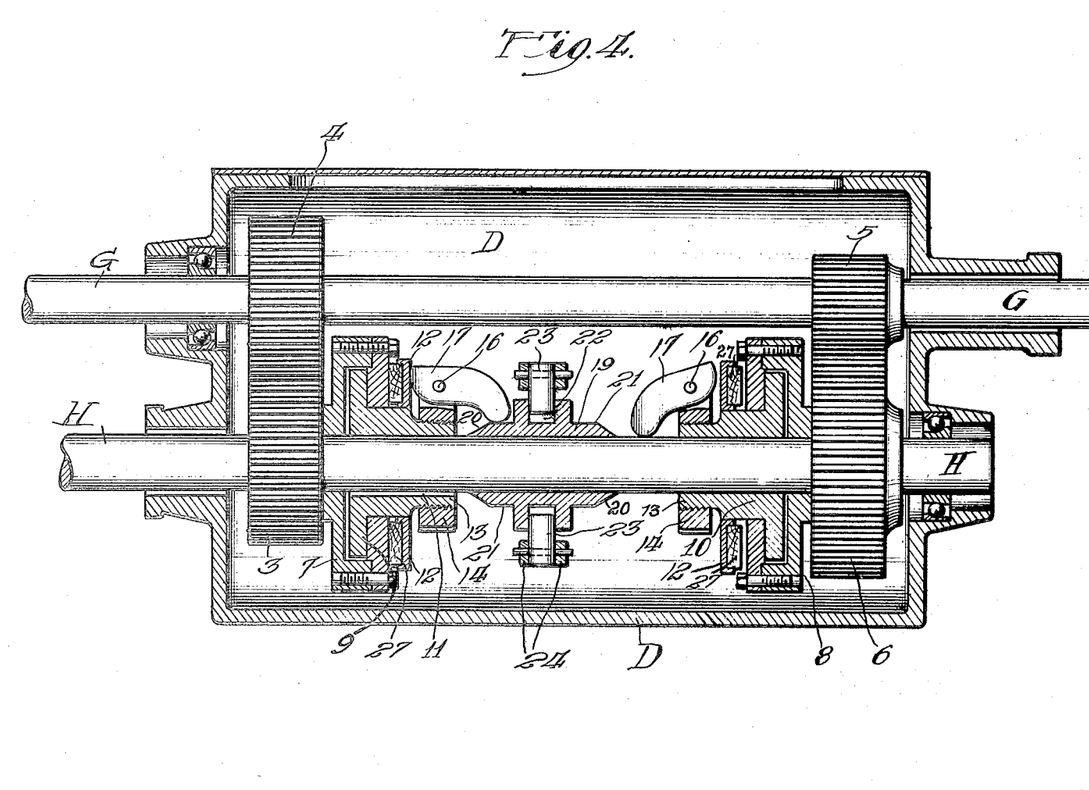
Fig. 4 is a longitudinal, vertical, sectional view, enlarged, through the speed gear housing.
Figure 5:
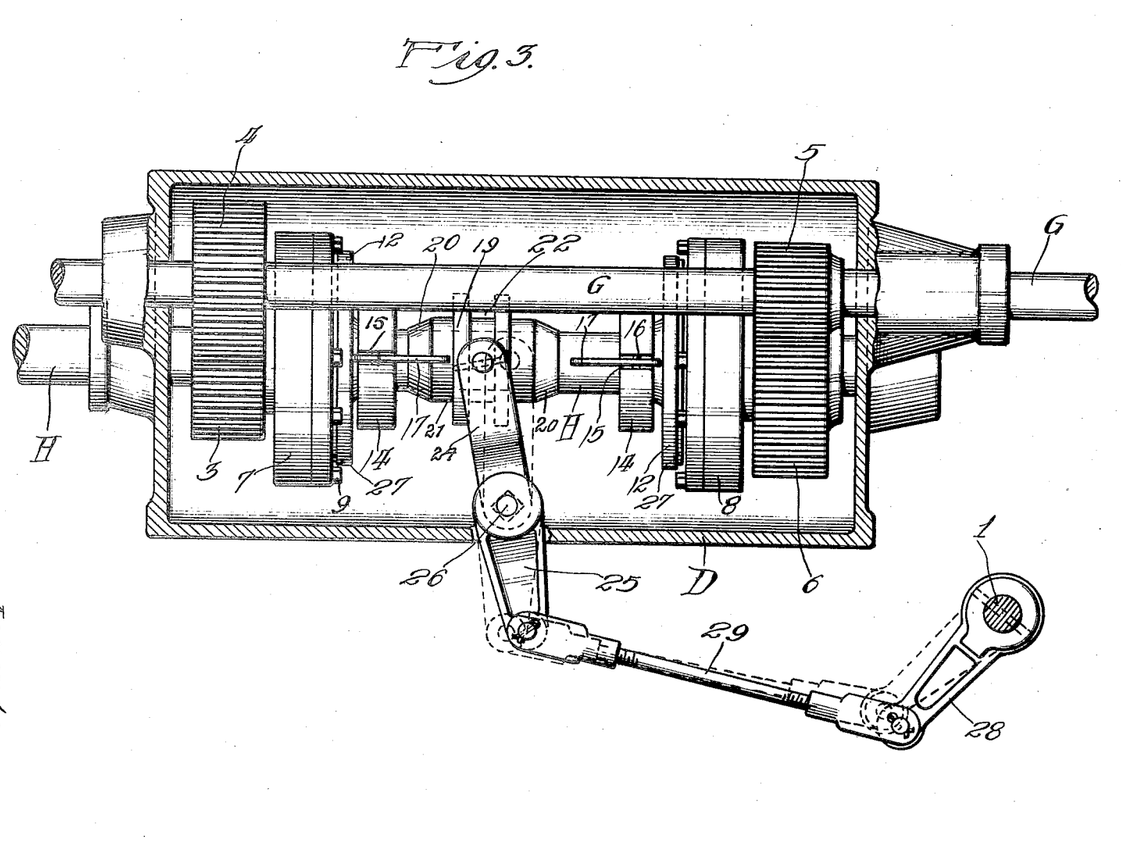
Fig. 5 is a longitudinal, vertical, sectional view, enlarged, through the reversing gear housing, the section being taken on the plane indicated by the dotted line 5—5 of Fig. 2.

Upon the inwardly projecting end 13 of each of the collars 9 and 10 is secured, preferably by screw bolts, a collar 14 provided with a recess 15 in its periphery, the direction of which recess is parallel to the longitudinal axis of the shaft H. In said recess 15, suitably pivoted at 16, is a lug 17, the short arm of the lug 17 bearing against one face of the disc 12 of the clutch 9 when that clutch is to be in operation. The corresponding arm of the other lever 17 will be free from the corresponding face of the other clutch disc 12 when the latter is disengaged from the clutch 10, and vice versa. By reference to Fig. 4 it will be noticed that the long arm of one lever 17 is lowered so as to substantially bear upon the shaft H when the clutch member 10 is not in operation, while the corresponding arm of the lever 17 is somewhat raised above the shaft H when the clutch member 9 is in operation.

This raising and lowering, alternately, of the levers 17, is accomplished by the alternate forward and backward movement of a rotatable, cam-surfaced spool 19, mounted to slide longitudinally on the shaft H and which rotates therewith. This spool 19 is provided at each of its ends with tapered cam surfaces 20, each leading to an annular shoulder 21. When the stem 19 is moved in the direction of the clutch 9, the long arm of the lever 17 will ride up over the cam surface 20 on the proximate end of the spool 19, and rest upon the shoulder 21, thus oscillating the lever 17 so that its short end will bear against the clutch disc 12 and clamp said disc and the face of the clutch 9 firmly together. The same action will take place with respect to the other lever 17 when the spool 19 is moved in the opposite direction, namely: toward the clutch 10, this movement releasing the clutch action between the plates 9 and disc 12 and effecting the clutch action between the disc 12 and the clutch member 10.

The spool 19 is provided with a central, annular groove 22 adapted to receive operating pins or bolts 23, secured in the spreading arms 24, 24, of a yoke lever pivotally mounted on the housing D to the lower end of a rotatable bolt or stud 26, said stud 26 carrying upon its upper end, outside the housing D, an operating lever arm 25. By this construction, it will be understood, the spool 19 may be constantly rotated with the shaft H and yet be in position to be shifted longitudinally of the shaft toward the clutch 9, or the clutch 10 by means of the lever 25 when it is desired to change the speed from high to low, or the reverse. In the position of the parts shown in Fig. 4, power is transmitted through the shaft G from any suitable source, as for example, an internal combustion engine, or the beveled pinion I, to the gear 4 and to the small gear 3, and when this small gear 3 is locked by the clutch mechanism just described to the shaft H, the shaft H will be rotated at high speed. In the reverse position of the parts shown in Fig. 4, the power would be transmitted from the shaft G through the small pinion 5 to the large spur gear 6 and the latter being locked to the shaft H through the clutch 10, would give low speed rotation to the shaft H.

The lever arm 25 is operated from the operating shaft 1, by the rotation thereof, by the following means: Upon the lower end of the shaft 1 is a lever arm 28, which is connected to the lever arm 25 by means of the adjustable link 29, as shown in Fig. 3. When the shaft 1 is rotated, the lever arms 25 and 28 and the link 29 will assume the positions shown in dotted lines, thus releasing the clutch 9 and bringing the spool 19 into intermediate or neutral position, while further movement in the same direction will bring the spool 19 toward the clutch 10. This rotary movement of the operating shaft 1 is effected by a lateral movement of the handle 2 to the right or left, as the case may be.

Figures 7, 8:
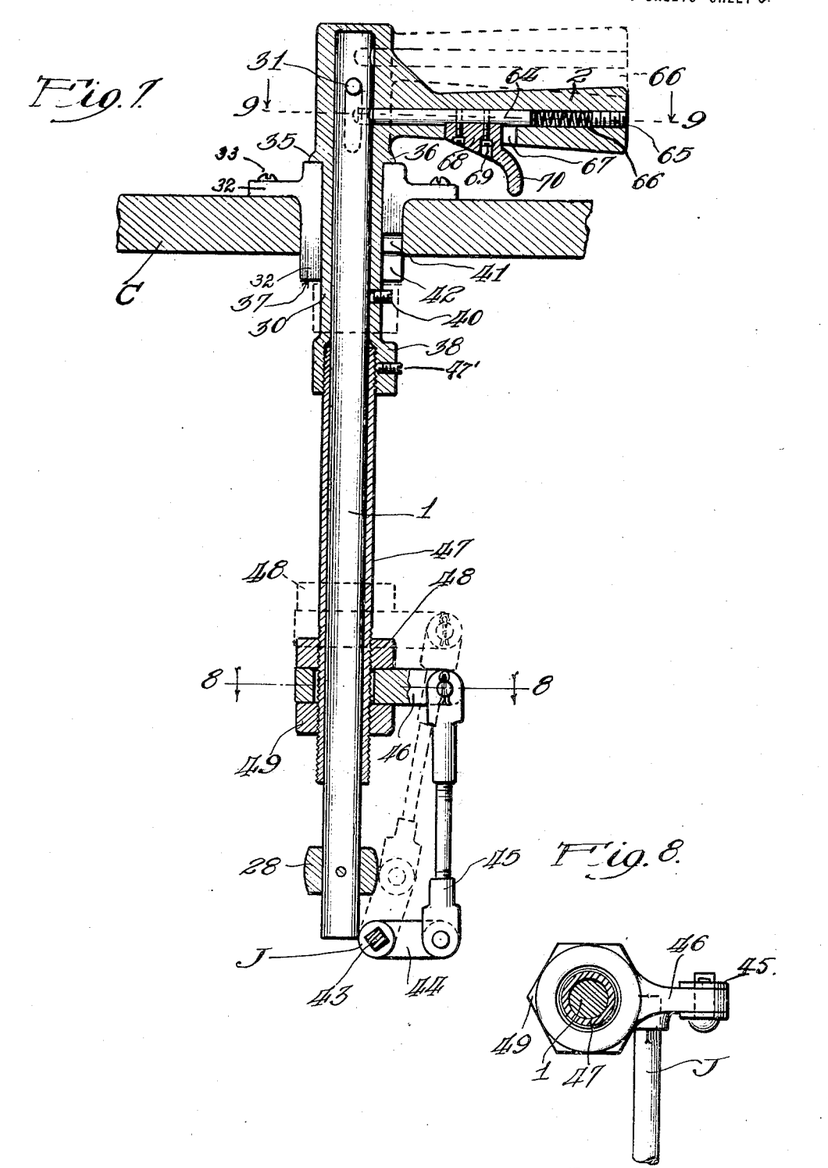
Fig. 7 is a detached view, enlarged, of the vertically disposed operating rod, some of the associated parts being shown in section, taken on the plane of the dotted line 7—7 of Fig. 2.
Fig. 8 is a horizontal sectional view of the operating shaft and its surrounding housing, some of the parts being shown in top plan view, the plane of the section being on the line 8—8 of Fig. 7.
Figure 9:
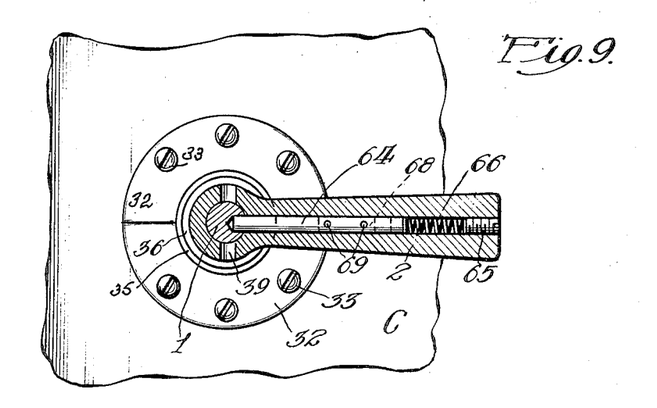
Fig. 9 is a horizontal sectional view through the operating handle, the plane of the section being on the line 9—9 of Fig. 7.
Figure 10:
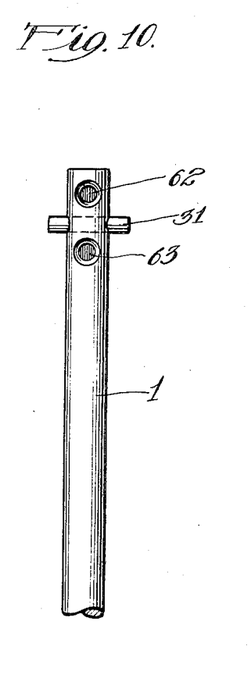
Fig. 10 is a detail view, in elevation, showing the upper end of the operating shaft.
Figure 11:
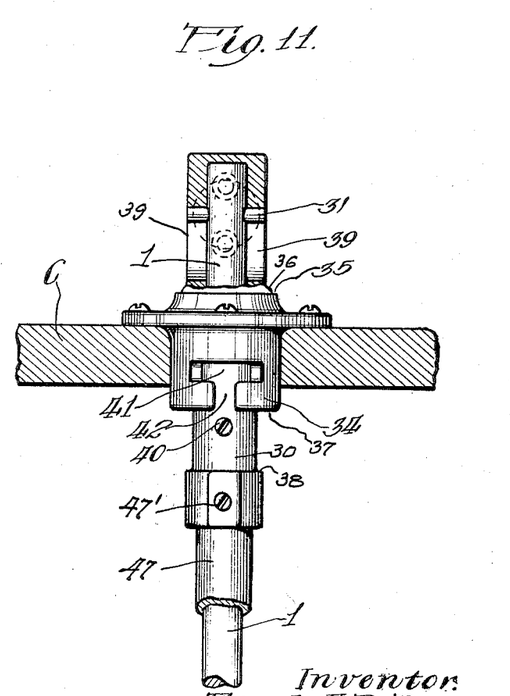
Fig. 11 is a detail view showing the upper end of the operating shaft and its associated parts in elevation, some of the parts being in section.

The upper end of the shaft 1 has a rotating bearing support in an elongated, tubular sleeve 30 of the handle 2, a bolt or pin 31 which passes through the sleeve and the shaft securing the two parts together. A circular, split plate 32 is attached by bolts 33 to the top of the floor C. Said circular plate is provided with a downwardly projecting tubular bearing hub 34 and on its upper side with a slightly raised boss or projection affording the shoulder 35. As shown in Figs. 7, 9 and 11, the sleeve 30 projects vertically through and has rotative bearing in the boss 34, which latter projects through a proper opening in the frame piece C. The surface 35 engages a suitable shoulder 36 on the tubular extension 30 of the handle and limits the movement of the latter in one direction; while the lower surface 37 of the boss 34 engages a suitable projection 38 on the sleeve 30 when the handle 2 is vertically raised and limits its upward movement.

Relative longitudinal movement between the shaft 1 and the tubular sleeve 30 is permitted by reason of an elongated slot 39 in the handle 2, through which slot the bolt 31 is passed. In Figs. 7 and 11, the handle 2 is shown in full lines in its lowermost position, with the bolt 31 in the upper portion of the slot 39. When the handle is raised with respect to the operating rod 1, its position is indicated by the dotted line of Fig. 7. This relative movement between the handle and its tubular sleeve 30 with respect to the operating rod 1 may only be accomplished, however, when in the neutral position, because when in the position indicated in full lines, that is, in the lowermost position, of the handle 2, a pin or bolt 40 radially projecting from the sleeve 30, will engage the shoulder 37 in every position excepting neutral.

Extending upwardly from the shoulder 37 of the boss 34 is a T-shaped slot, the upper member 41 of which extends horizontally and circumferentially, and the lower member 42, vertically. The slot 41, 42, is of a depth sufficient to connect the periphery of the boss 34 with its inner wall in which the sleeve 30 is mounted. The handle 2 must be so turned or rotated about the operating rod 1 as to bring the radial bolt 40 opposite the slot 42 before the handle 2 and its tubular extension or sleeve 30 may be given vertical movement with respect to the operating shaft 1. When the handle 2 has been thus raised, so that the bolt 40 having passed through the slot 42 rests in the slot 41, then the handle 2 may be turned to the right or to the left in the laterally disposed slot 41, precisely as the handle 2 may be similarly turned to the right or to the left when in the lower position, shown in full lines in Fig. 11.

The raising of the tubular sleeve 30 and the handle 2 to the upper position causes a rotative action of the gear shifting rod J which extends longitudinally of the machine, as clearly shown in Figs. 1 and 2. The rotation of this rod J is accomplished in the following manner: Attached to the squared end 43 of the rod J is a lever 44, connected by an adjustable link member 45 to an apertured arm 46. The arm 46 surrounds the lower end of an exteriorly screw threaded tubular housing 47. Adjusting and locking nuts 48 and 49 above and below the arm 46 secure the latter to the housing 47 in proper adjusted position. The upper end of the tubular housing 47 is screw threaded to engage an interiorly screw threaded recess in the enlarged lower end of the sleeve 30 and is suitably locked thereto by a screw bolt 47' or other means. When the handle 2 is raised, the sleeve 30 slides upwardly on the rod 2, it will carry with it the tubular housing 47, the arm 46 and the end of the link 45. The lower end of the link 45 is secured to the outer end of the short lever 44, and it therefore follows that the rod J, to which the lever 44 is secured, must rotate, the parts changing, in this movement, from that position indicated in full lines to that indicated by the dotted lines of Fig. 7.

Figure 6:
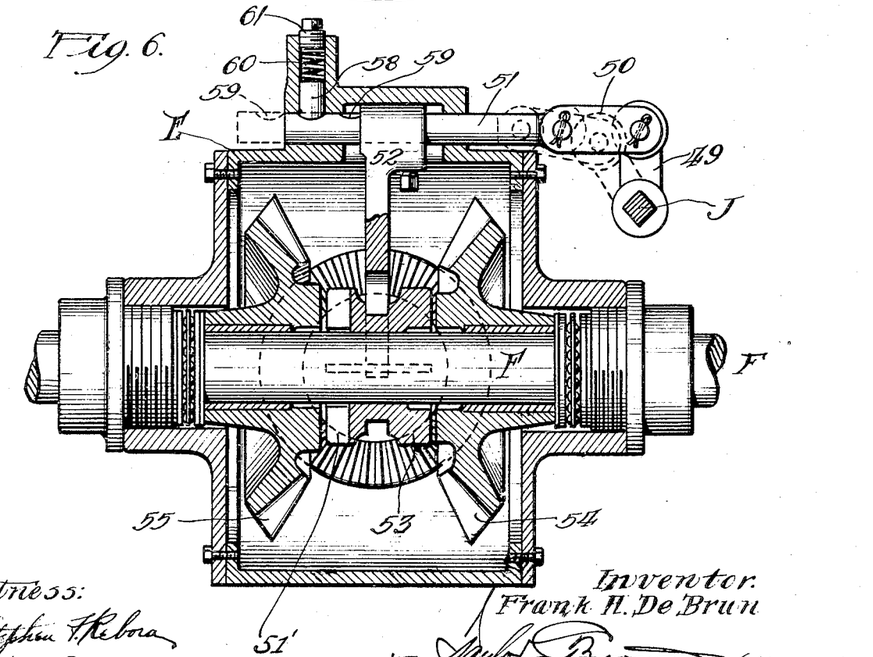
Fig. 6 is a vertical sectional view of the parts shown in Fig. 5, the section being taken on the plane of the dotted line 6—6 of Fig. 2.

The rod J extends rearwardly to the reversing gear housing E and being suitably supported in bearing brackets K, K, is provided at a point near the housing E with an upwardly directed lever 49. This lever 49 is pivotally connected by a link 50 to a rod 51, the latter being mounted in the top of the reverse gear housing E, so as to have a longitudinal sliding movement. Attached to the rod 51 is an operating yoke arm 52, the lower ends of which straddle a clutch spool 53 slidably mounted upon and keyed at 56 to the driven shaft F, so as to rotate therewith. The faces of this spool 53 carry the usual clutch lugs 51' adapted to engage complemental clutch recesses or lugs on the inner faces of two beveled gears 54, 55, which latter are loosely mounted on the shaft F. When the clutch spool 53 is in the position shown in full lines in Fig. 6 it is in neutral, and the shaft F will turn loosely in said gears 54, 55; but when the spool 53 is moved to one side or the other, the gear 54 or 55 thus engaged becomes locked to the shaft F. The teeth of both of these two gears, 54 and 55, engage and mesh with a beveled driving pinion 57 upon the shaft H. The constant rotation of the driving pinion 57 in one direction will thus cause the rear axle or driven shaft F to be rotated in one or the other direction, or to remain neutral, precisely as the sliding clutch spool 53 remains in the neutral position or is moved to engage and lock to the shaft F, to either one of the loose beveled gears 54 or 55. It is manifest that one of said gears when locked to the shaft or axle F will turn the latter in the forward direction and the other when locked to the said shaft will turn it in the reverse direction.

In order to hold the sliding rod 51 in the forward, in the reverse or in the neutral position, a spring-pressed friction bolt 58, vertically mounted in a suitable recess in the reverse gear housing E, is adapted to engage the notches or recesses 59 in said bolt 51. The bolt 58 is given a yielding tension contact with the bolt 51 by a coiled spring 60 located in the bolt recess and adjustably held therein by the screw bolt 61.

In order to permit of the raising of the handle 2 without raising the operating rod 1, the following arrangement is provided: In the upper portion of the rod 1 are upper and lower detents or recesses 62, 63, adapted to be engaged by the end of a sliding bolt 64, which latter is located in a longitudinally disposed aperture in the handle 2, the outer end of which aperture is closed by a screw plug 65. Between the end of the screw plug 65 and the end of the bolt 64 is a tension spring 66 which tends to keep the bolt 64 pressed forwardly with its end in one of the recesses 62, 63. Projecting through a longitudinally disposed slot 67 in the under part of the handle 2, is a plug 68 which is secured, by screws 69 or otherwise, to the bolt 64. 70 is a hand trigger secured to or integral with the plug 68. It will be obvious, from an inspection of Figs. 7 and 9, that upon the operator grasping the trigger 70, the bolt 64 may be moved in opposition to the spring 66 until its end is released from engagement with the recesses 62 or 63, as the case may be. While the bolt 64 is thus withdrawn from contact with the shaft 1, the operator may raise the handle 2 and effect the rotation of the rod J as previously explained. The same action will take place when the handle 2 is moved from its raised position to the lowered position. When the raising or lowering movement is completed and the operator releases his hold on the trigger 70, the spring 66 will promptly cause the bolt 64 to again engage one of the recesses in the shaft 1 and thus prevent relative movement between the sleeve 30 and said shaft 1, until the trigger 70 is again operated.

It will be manifest from the foregoing description that in order to change the speed from high to low or vice versa, all that the operator has to do is to grasp the handle 2 and swing it to the right or to the left, as the case may be, and that this is true whether the car is moving forward or backward. It will also be manifest that in order to effect a reversal of movement, the handle 2 must first be swung into the neutral speed position, the trigger 70 must be grasped and the bolt 64 withdrawn before the handle 2 may be raised or lowered for the purpose of effecting the reversal of movement; and that when such reversal has been accomplished and the trigger 70 released, the power may be again put into high or low speed by the swinging of the handle 2 to the right or to the left, as the case may be. In other words, the untutored operator of a car equipped with my invention has but one piece of mechanism to grasp in order to effect the change of direction and of speeds.

It is obvious that many changes in the mechanical details may be made without departing from the principle of my invention; but after successful demonstration and use of the invention in that form illustrated and herein described, I recommend the same as practical and serviceable. I do not, however, desire my invention to be limited to the precise details of construction illustrated and described, except as pointed out in the appended claims.

I claim as my invention:

1. In a structure of the kind described, the combination with driving and driven shafts, of a change speed unit operatively connected with the driving shaft, a reversing gear unit operatively connected with the driven shaft, and a single operating handle operatively connected with and adapted to directly control each of said units, whereby the change speed unit may be actuated independently of the reversing unit in either of the two positions of the latter.

2. The combination with a change speed unit and a reversing unit, a driving shaft connected with the former and a driven shaft connected with the latter, and operative connections between said units, of a shaft operatively connected with the speed unit, a tubular housing operatively connected with the reversing unit and a handle operatively connected with said shaft and said housing.

3. The combination with driving and driven shafts operatively connected, of a reversing gear unit on the driven shaft, a housing supported on an operating shaft extending therethrough, means for actuating the operating shaft and said housing, operative connections between the housing and the reversing unit for actuating the latter, comprising a rock shaft connected at one end to the reversing unit and having a lever on its other end, a lifting arm mounted on the housing and a link connecting said arm and said lever.

4. The combination with driving and driven shafts operatively connected, of a reversing gear unit on the driven shaft, a shaft support, a tubular housing and means for actuating the same, said housing being mounted upon said shaft support, and operative connections between the housing and the reversing unit for actuating the latter, comprising a rock shaft connected at one end to said unit and having a lever on its other end, a lifting arm adjustably mounted on the housing and a link connecting said arm and said lever.

5. The combination with driving and driven shafts operatively connected, of a reversing gear unit on the driven shaft, a shaft support, a change speed unit operatively connected to the shaft support, a tubular housing mounted on said shaft support, means for operating said housing, and operative connections between the housing and the reversing unit for actuating the latter, comprising a rock shaft connected at one end to said unit and having a lever on its other end, a lifting arm adjustably mounted on the housing and a link connecting said arm and said lever.

6. A motor transmission control, having driving and driven shafts operatively connected, a change speed unit mounted on the driving shaft, a transmission shaft operatively connected with the change speed unit, a reversing unit mounted on the driven shaft, and operatively connected with the transmission shaft, a rock shaft operatively connected at one end to the reversing unit, an operating shaft connected with the change speed unit, a housing upon said operating shaft connected with said rock shaft, a handle operatively connected with the operating shaft and the housing, and means associated with the handle whereby either unit may be controlled as desired.

7. The combination with a change speed unit and a reversing unit, a driving shaft connected with the former, a driven shaft connected with the latter and operative connections between said units, of a tubular housing connected directly with the reversing unit, an operating shaft within the housing and connected directly with the change speed unit, and a handle operatively connected with the operating shaft and with the tubular housing and adapted to produce a rotative movement of said shaft and a longitudinal movement of said housing.

8. The combination with driving and driven shafts, of a change speed unit and a reversing unit operatively connected to said driving and driven shafts, respectively, and operatively connected together, of a support, a bearing in said support, a handle carrying an elongated boss longitudinally and rotatably mounted in said bearing, an operating shaft mounted in said boss and extending through said housing, means operatively connecting said housing with the reversing unit including reciprocating means for said housing, means for operatively connecting the operating shaft with the speed gear unit including rotatable means for said shaft, said rotatable and said reciprocating means being connected with the handle.

9. The combination with a shaft operatively connected with a speed gear mechanism and a housing surrounding said shaft and operatively connected with a reversing unit, of a handle to control both said shaft and said housing, a fixed bearing, an apertured boss on the handle mounted in said bearing and capable of reciprocal as well as rotary movement therein, the housing being secured to the said boss, and sliding connections between said boss and the operating shaft.

10. The combination with a shaft operatively connected with a speed gear mechanism and a housing surrounding said shaft and operatively connected with a reversing unit, of a handle to control both said shaft and said housing, a fixed bearing, an apertured boss on the handle mounted in said bearing and capable of reciprocal as well as rotary movement therein, the housing being secured to the said boss, and sliding connections between said boss and the operating shaft, said connections comprising a slot in the handle head and a pin projecting from said operating shaft with its ends in the slot.

11. The combination with a shaft operatively connected with a speed gear mechanism and a housing surrounding said shaft and operatively connected with a reversing unit, of a handle to control both said shaft and said housing, a fixed bearing, an apertured boss on the handle mounted in said bearing and capable of reciprocal as well as rotary movement therein, the housing being secured to the said boss, and sliding connections between said boss and the operating shaft, a slot in the bearing and a pin on the boss to prevent relative longitudinal sliding movement of the boss through the bearing except when the pin is opposite said slot, and means for rotating the housing in all positions except when said pin is in said slot.

12. The combination of a driving shaft having a change speed unit operatively connected therewith, a driven shaft having a reversing unit operatively connected therewith, a single operating handle connected to control the movement of both of said units, and means permitting actuating the change speed unit in either position of the reversing unit while preventing shifting of the reversing unit when the change speed unit is in either high or low speed positions.

In testimony, that I claim the foregoing as my invention I affix my signature, in the presence of two witnesses, this 24th day of February, 1920.

FRANK H. DE BRUN.

Witnesses:
BERTHA L. MACGREGOR,
L. A. PERLOW.